July 3, 1951 W. D. HORN ET AL 2,558,754

AUTOMATIC RADIO LISTENER SURVEY SYSTEM

Filed March 18, 1947 4 Sheets-Sheet 1

INVENTORS
Wm. D. Horn
& J. R. Ragazzini
By [signature]
ATTORNEY

AUTOMATIC RADIO LISTENER SURVEY SYSTEM

Filed March 18, 1947 4 Sheets-Sheet 2

INVENTORS
Wm. D. Horn
& J. R. Ragazzini
By [signature]
ATTORNEY

AUTOMATIC RADIO LISTENER SURVEY SYSTEM

Filed March 18, 1947 4 Sheets-Sheet 3

INVENTORS
Wm. D. Horn
& J. R. Ragazzini
By [signature]
ATTORNEY

INVENTORS
Wm. D. Horn
& J. R. Ragazzini
By [signature]
ATTORNEY

Patented July 3, 1951

2,558,754

UNITED STATES PATENT OFFICE 2,558,754

AUTOMATIC RADIO LISTENER SURVEY SYSTEM

William D. Horn and John R. Ragazzini, New York, N. Y.; said Ragazzini assignor to said Horn Application March 18, 1947, Serial No. 735,441

12 Claims. (Cl. 235—52)

This invention relates to an automatic radio listener survey system and more particularly to a system for making an automatic record at frequent intervals of the operation of a number of radio receivers which are tuned to a given radio broadcast.

An object of the invention is to provide a system of the above type which automatically records at a central point the tuning of many different radio receivers.

Another object of the invention is to provide a system of the above type which is operated automatically without the aid of special signals from the broadcast stations and consequently does not require the cooperation of the broadcast companies.

Another object is to provide a system of the above type which makes a substantially continuous record of the number of selected radio receiving sets tuned to the different radio broadcasts.

Another object is to provide a system of the above type having novel and improved details of construction and features of operation.

Various other objects and advantages will be apparent as the nature of this invention is more fully disclosed.

In accordance with the present invention, the control is effected in response to a recurring normal characteristic of the broadcast program as distinguished from a special control signal which might be transmitted in addition to the regular program. Such normal characteristic may comprise a selected audio frequency note or series of notes, a selected audio volume level or a selected power level of the carrier or intermediate frequency. In a specific embodiment the silent periods are utilized for the control. Such periods may, for example, constitute the intervals between words of a spoken program or the rests in a musical program. We have found that such silent intervals sometimes occur simultaneously in a plurality of programs, such as at the beginning and end of the program period. In order to prevent registration during such simultaneous silent periods, we provide means for rendering the recording apparatus ineffective when a silent period appears on more than one program at the same time.

More specifically, we provide at selected radio receivers a control circuit which is connected to the audio output of the receiver and is provided with means for producing a control signal for actuating a relay during intervals of zero audio frequency output. The relay connects a predetermined reactive load to the power line for a predetermined short interval of time which is independent of the length of the period of silence. For example, the reactive load may be connected for a period of a selected fraction of a second, although the period of silence which instigated the connection of the reactance may have lasted for only a small portion of that time or may have continued beyond that period.

These automatically controlled reactors are installed in a selected number of receivers in localities supplied by a central power station, for example, a thousand receivers which may be distributed throughout the community.

For recording the total number of reactors which are connected across the power line at any one instant, a series of central monitors are provided which control automatic var meters for measuring the reactive-volt-amperes of the line. A separate monitor is provided for each broadcasting station or network to be monitored. Each monitor is tuned to the broadcast station which is to be monitored thereby and includes an audio frequency circuit which, like the home receiver, is adapted to produce a control signal during periods of audio frequency silence. This control signal is connected to actuate a var meter which is capable of measuring and recording the increment in reactive-volt-amperes on the power line during the period of measurement.

In order to prevent the system from recording during periods when reactors are on the power line simultaneously in response to silences on two or more broadcast stations, each monitor also includes means for producing an inhibiting signal for a fixed period after the onset of a silence. During the fixed period after the onset of a silence on each monitor's respective program the monitor sends out an inhibiting signal which prevents other monitors from recording. When these fixed periods on different monitors overlap, no monitor can record because each monitor inhibits the others.

Hence each monitor makes a continuous record of the reactive load thrown on the power line in response to the periods of silence on its respective broadcast program, but records only when it receives no inhibiting signals from other monitors.

Although the novel features which are characteristic of this invention are pointed out more particularly in the claims, the nature of the invention will be better understood by referring to the following description, taken in connection with the accompanying drawings in which a specific embodiment of the invention has been set forth for purposes of illustration.

Figure 3:
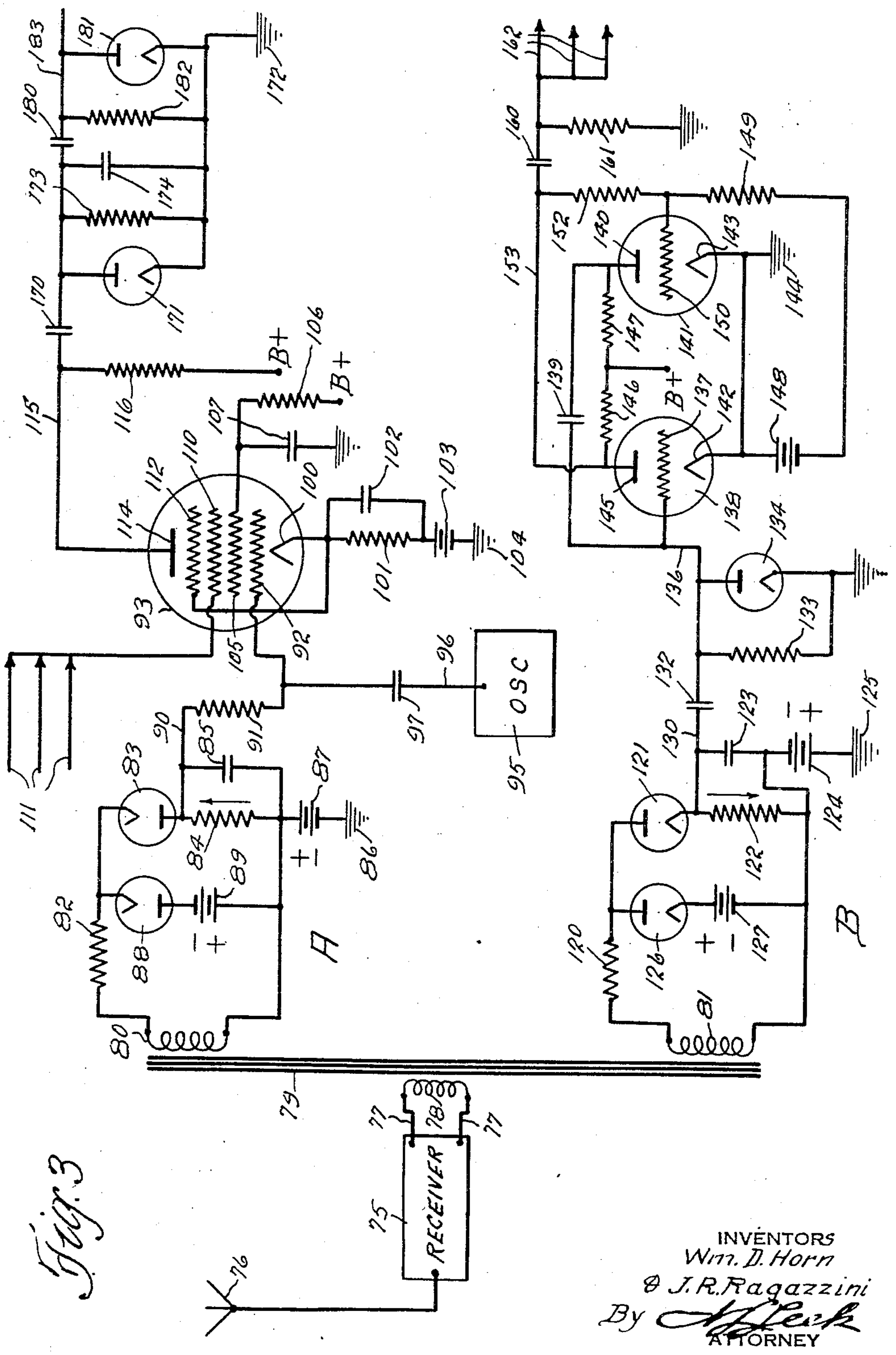
Figure 4:
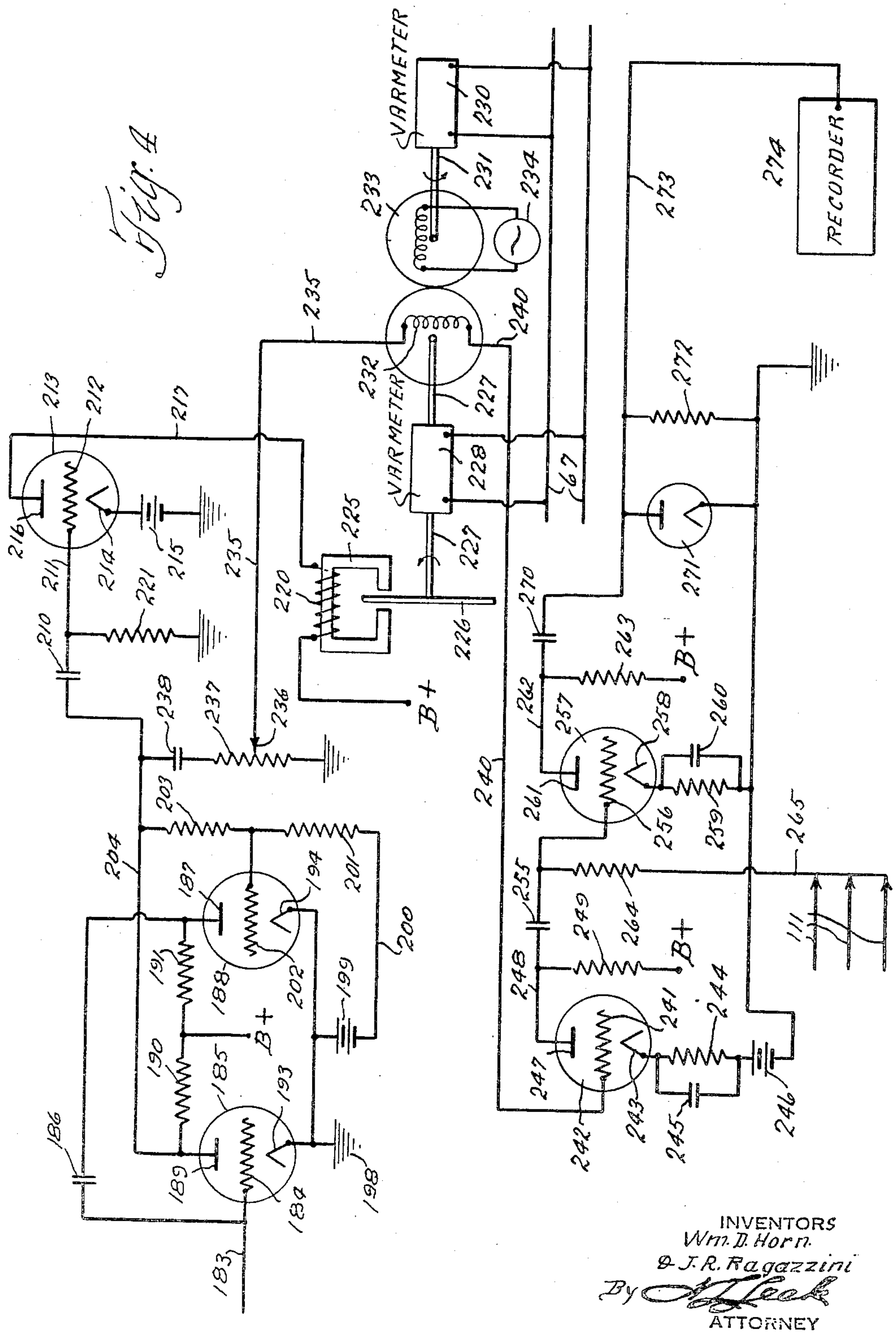

Figs. 3 and 4, taken together, are a schematic circuit diagram of the central monitor system.

Figure 1:
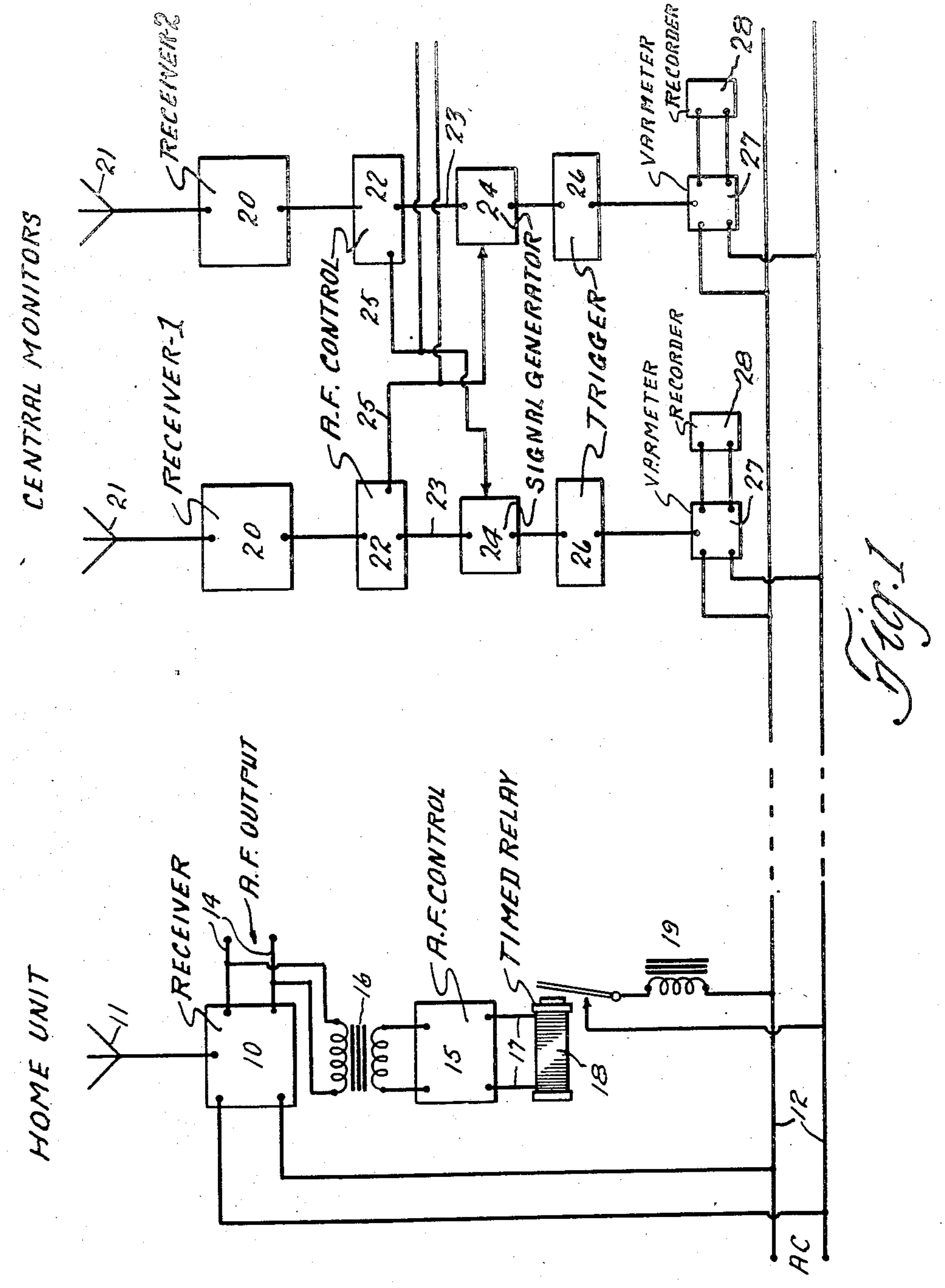
Fig. 1 is a block diagram illustrating a monitoring system embodying the present invention.

Referring first to Fig. 1, the home receiver 10 is shown as connected to an antenna 11 and supplied with power from an AC power line 12. The receiver is provided with an audio frequency output line 14 of the usual character. To this line an audio frequency control device 15 is connected through an audio frequency transformer 16. The audio frequency control device is adapted to respond to the audio frequency output of the receiver 10 and to produce a control signal during zero audio frequency output periods. The control signal is supplied through output lines 17 to actuate a timed relay 18 which is adapted to connect an inductive load 19 across the alternating current power supply line 12 and to maintain the load connection for a predetermined period regardless of the duration of the control signal. It is to be understood that one of the units is connected to each of the selected radio receivers which are to be registered.

At a central point, a plurality of monitors are provided, two of which are shown in Fig. 1. Each monitor comprises a receiver 20, connected to an antenna 21 and to an audio frequency control circuit 22 which is adapted, during periods of audio frequency output silence, to supply a control signal through a line 23 to a signal generator 24, and to supply an inhibiting signal through a line 25 to the signal generators 24 of the other monitors. The signal generator 24 is adapted, when actuated by the control signal, to produce a timed signal having a definite duration. This timed signal is supplied to a trigger circuit 26 which in turn is connected to actuate a var meter 27 which is connected to the power supply line 12 and is adapted to measure the reactive-volt-amperes thereon. The var meter 27 is connected to a recorder 28. The power line 12 may of course be three phase and has been shown as a single phase line for convenience only.

A number of these monitors are provided, corresponding to the number of radio networks and unaffiliated stations to be monitored. Each monitor system is adapted to measure the inductive load on the power line only during a fixed period after the onset of a silent period on its particular broadcast program. During these periods the inductive loads 19 of the various home units which are tuned to that station are connected across the line. Consequently, the total added reactive load is a measure of the number of home units which are tuned to that particular broadcast station.

Figure 2:
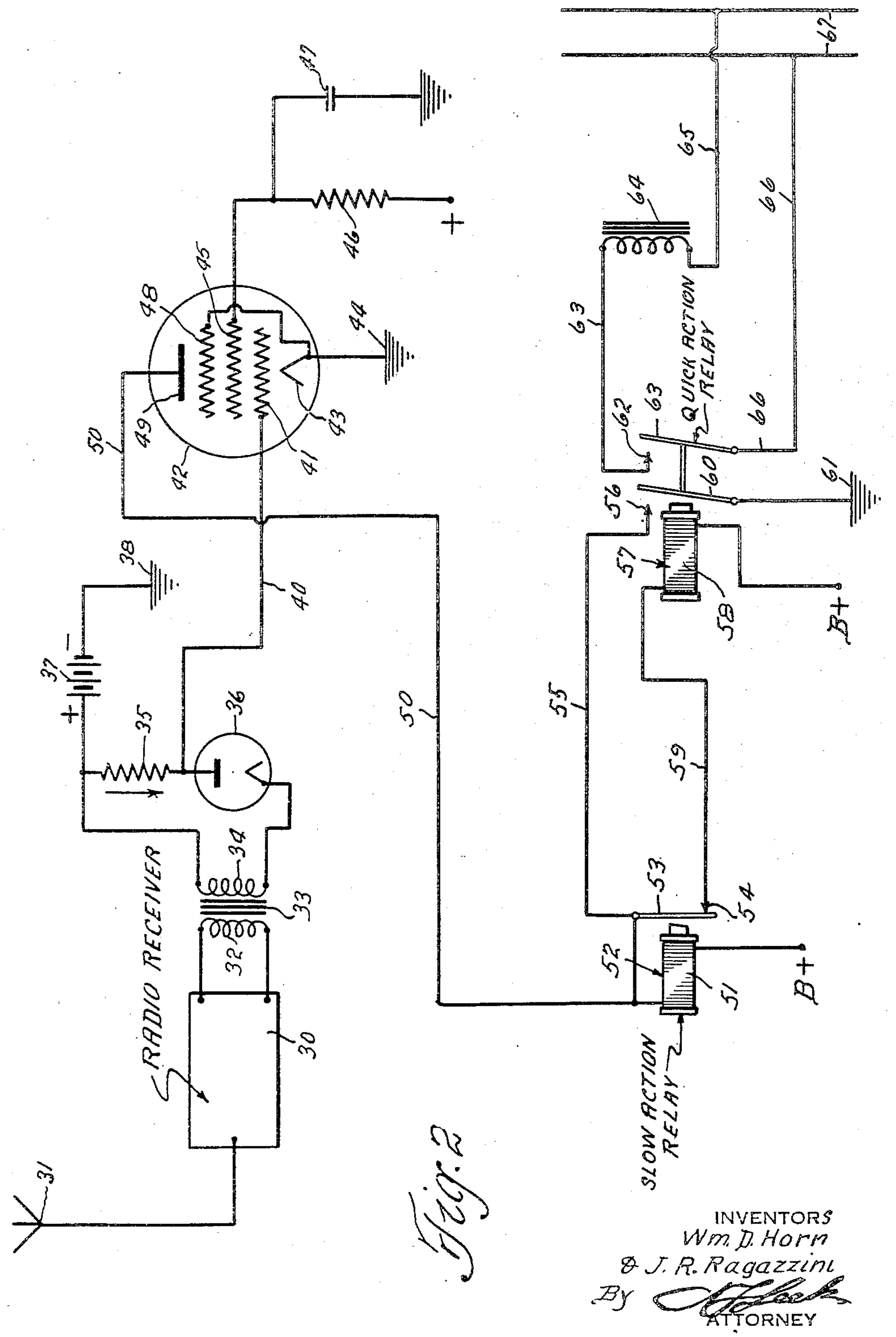
Fig. 2 is a schematic circuit diagram of the home receiver unit.

One embodiment of the home unit receiver circuit is shown in more detail in Fig. 2. Referring to Fig. 2, a standard radio broadcast receiver 30 is shown as connected to an antenna 31 and is supplied with an audio output line connected to the primary 32 of an audio frequency transformer 33 having a secondary 34 connected in series circuit with a resistor 35 and a rectifier tube 36. The resistor 35 is connected through a biasing battery 37 to ground at 38, and by a line 40 to the control grid 41 of an amplifier tube 42.

The tube 42 is shown as a pentode having a cathode 43 connected to ground at 44, a screen grid 45 connected through a resistor 46 and a shunt condenser 47 to a source of positive biasing potential, a suppressor grid 48 connected to the cathode 43, and an anode 49 which is connected by a line 50 through a coil 51 of a slow acting relay 52 to a source of positive plate potential. The relay coil 51 actuates an armature 53 engaging a normally closed contact 54. The armature 53 is connected to the line 50, and by a line 55 to a contact 56 of a four-pole quick acting relay 57 having armatures 60 and 63 engaging contacts 56 and 62 respectively. The relay 57 is provided with a coil 58 which is connected by a line 59 to the contact 54 of the relay 52. The coil 58 is also connected to the source of positive plate potential for the tube 42. The armature 60 of the relay 57 is connected to ground at 61. The armatures 63 and 62 connect an inductive reactance 64 through leads 65 and 66 to an alternating current power line 67 which is preferably the line from which the receiver 30 is energized.

In the operation of the system of Fig. 2, the audio frequency output of the receiver 30, after passing through the transformer 33, is rectified by the rectifier tube 36 and causes a unidirectional current to flow through the resistor 35 in the direction of the arrow, producing a potential drop across that resistor in a direction to supply a negative bias with respect to ground to the lead 40. The value of this bias due to audio frequency signals of predetermined values overcomes the positive bias produced by the battery 37 and biases the control grid 41 of the tube 42 negative to the point of cut-off so that no current flows in the plate circuit of the tube 42. When a silence occurs, however, or the audio frequency output of the receiver 30 falls below a predetermined value the negative voltage drop across the resistor 35 is removed, allowing the battery 37 to introduce a positive bias to the control grid 41 which causes the tube 42 to become conductive. The tube 42 passes a heavy plate current which flows through the coil 51 of the slow acting relay 52. Plate current also flows through the closed contact 54 of the relay 52 through the line 59 to the coil 58 of the quick acting relay 57. The relay 57 thereupon immediately actuates its armature to close contacts 56 and 62. Closing of the contact 62 throws the reactor 64 across the line 67 and serves to increase the reactive volt-amperes on the line 67 by one unit. Closing of the contact 56 connects the coils 51 and 58 of the relays 52 and 57 to ground and establishes a holding circuit for these relay from the source of plate potential to ground.

After a predetermined period of time, the slow acting relay armature 53 is actuated to break the contact 54. This breaks the circuit to the coil 58 of the relay 57 and immediately releases that relay. Releasing the relay 57 disconnects the reactor 64 from the line 67 and breaks the holding circuit of the relays 52 and 57. If the tube 42 has ceased conducting by the time the holding circuit is broken, the relay 52 is restored to a normal and the system is in a condition to respond to the next silent period. If, however, the tube 42 is still conducting, the relay 52 remains open until the end of the period of silence which causes the tube 42 to be conducting. Consequently, the reactance 64 is connected across the line 67 for a predetermined period of time which is independent of the length of the period of silence which initiated the operation of the relay.

A period of silence which is sufficiently extended to operate the fast relay 57 will thus connect the reactor 64 to the line 67 for the predetermined fixed period of time. At the end of this silence period, or at the end of the fixed period, wichever is longer, the slow relay will return to its normal position and the home unit will be in condition to respond to the next period of silence. This fixed period of time may, of course, constitute only a fraction of a second and is only sufficient to allow the recorder to be actuated at the monitoring station. The period is preferably maintained as short as possible in order to reduce the possibility of interference with the record due to changes in the reactive load from other causes during the measuring and recording period.

If the system is to respond to acoustic levels other than zero, the bias of the battery 37 may be adjusted accordingly. The system may, for example, be adjusted to respond to acoustic levels higher than normal or in a given range. The system may be made responsive to signals of a selected frequency only by including a suitable filter ahead of the tube 36. Combinations of these systems may also be used.

Referring to Figs. 3. and 4, one of the monitoring systems is shown as a standard radio receiver 75 connected to an antenna 76 and assumed to be tuned to the same broadcast program as the radio receiver 30 of Fig. 2. In the case of a network program, the program may be received from different stations by the home receiver and the monitor. The receiver 75 may be of any standard type providing an audio frequency output which is supplied by lines 77 to the primary 78 of a transformer 79. The transformer 79 is provided with a pair of secondaries 80 and 81 which are connected to control circuits A and B respectively for producing respectively the control and the inhibiting signals.

The secondary 80 is series connected through a resistor 82 with a rectifier tube 83 and a resistor 84, by-passed by condenser 85. The resistor 84 is grounded at 86 through a battery 87 which is connected to supply a positive bias with respect to ground. A limiting tube 88, to which a negative bias is supplied by a biasing battery 89, is connected across the tube 83 and resistor 84. The connections are such that the audio frequency output from the receiver 75 causes a rectified current to flow in the direction of the arrow through the resistor 84 for producing a voltage drop across that resistance. The negative end of the resistor 84 is connected through a line 90 and resistor 91 to the control grid 92 of an amplifier tube 93. The connections are such that with a normal audio frequency output to the secondary 80, the voltage drop across the resistor 84 produces a negative bias with respect to ground which is sufficient to block the tube 93. However, during silence periods, the battery 87 supplies a positive bias through the line 90 to the control grid 92 which causes the tube 93 to function. The tube 93 accordingly functions only during the silence period.

The control grid 92 is also supplied with an alternating voltage from an oscillator 95 which is connected through a lead 96 and condenser 97 to the grid 92. The oscillator 95 may be of any standard type adapted to operate continuously to produce a continuous signal and to supply the same to the control grid 92. The A. C. signal, however, is amplified by the tube 93 only during the silence periods when a positive bias is supplied to the control grid from the battery 87. The tube 88 and biasing battery 89 constitute a limiter to prevent the negative bias supplied to the line 90 from becoming excessive. If the battery 89 is of the same potential as the battery 87, then the potential drop across the resistor 84 will only become sufficient to equal the potential of the battery 87 and cancel the positive bias produced thereby. In that event the bias on the grid 92 would vary from the positive value of the battery 87 to zero. It is to be understood, however, that suitable adjustments may be made to produce the desired operating effect and that the selected acoustic level may be other than zero as in the case of the home receiver circuit.

The tube 93 is shown as provided with a cathode 100 which is connected through resistor 101 and condenser 102 and biasing battery 103 to ground at 104, and with a screen grid 105 which is connected through a resistor 106, by-passed by condenser 107, to a source of positive biasing potential. A second control grid 110 is connected to input lines 111 to receive an inhibiting signal from the other monitors to be described. A suppressor grid 112 is connected to the cathode 100. An anode 114 is connected by an output lead 115 and a resistor 116 to a source of positive plate potential. The arrangement is such that during audio frequency silence periods an A. C. voltage from the oscillator 95 appears in the lead 115, but during normal periods of operation with an audio frequency output, the tube 93 is blocked and no signal appears on the lead 115.

The audio control circuit B connected to the secondary 81 is similar to the control circuit A except that the circuit B produces a negative signal during silence periods. For this purpose, the secondary 81 is connected through a resistor 120 to a rectifier tube 121 and a resistor 122 in series circuit. A condenser 123 is connected across the resistor 122. During periods of audio frequency output to the secondary 81, a rectified current passes through the resistor 122 in the direction of the arrow, producing a voltage drop thereacross. The negative end of the resistor 122 is connected through a biasing battery 124 to ground at 125. The battery 124 is connected to supply a negative bias with respect to ground to the resistor 122. A limiter tube 126 with a biasing battery 127 is connected across the tube 121 and resistor 122 to limit the voltage drop produced across the resistor 122.

The positive end of the resistor 122 is connected by a lead 130 and a condenser 132 to a grounded resistor 133.

During normal audio frequency output periods the positive voltage drop across the resistor 122 balances the negative bias of the battery 124 so that the lead 130 remains substantially at ground potential. However, during silent periods when no current flows through the resistor 122, the lead 130 receives the negative bias from the battery 124. A negative pulse is thus supplied to the condenser 132 and resistor 133 during silent periods. Any positive pulses on the line 130 are by-passed to ground through a rectifier tube 134 which is connected in parallel to the resistor 133.

The resistor 133 and the rectifier tube 134 are connected by a lead 136 to the control grid 137 of a tube 138 and through a condenser 139 to the anode 140 of a tube 141.

The tubes 138 and 141 are provided with cathodes 142 and 143 which are connected to ground at 144, and with anodes 145 and 140 which are connected respectively through resistors 146 and 147 to a source of positive plate potential.

The cathodes are connected through a biasing battery 148 and resistor 149 to the control grid 150 of the tube 141. The grid 150 is connected through resistor 152 to an output lead 153 and to the anode 145.

In the operation of this gate circuit the tube 138 is normally conducting since its grid bias is zero while that of tube 141 is negative. This latter tube may be biased near cut-off by means of battery 148. When a negative pulse is applied to lead 136 it causes tube 138 to temporarily stop conducting. When this happens the potential of plate 145 suddenly becomes more positive and plate 145 assumes the positive potential of the plate supply. This positive increment of voltage is applied to resistor 152 and part of this pulse is applied to grid 150. This causes tube 141 to conduct temporarily. As a result, the plate of this tube, 140, suddenly drops in positive potential and current is drawn through condenser 139 while this condenser is charging to its new potential. This current is drawn through resistor 133, thus causing a negative voltage to be established on grid 137. During the time that condenser 139 is charging, this negative potential is maintained on grid 137 and tube 138 is maintained non-conducting. After the condenser 139 has fully charged to its new value of potential, current ceases to flow through resistor 133 and when this happens the bias on tube 138 is removed. This causes tube 138 to become conducting again. The plate 145 then drops suddenly in potential and this negative pulse is applied to resistor 152. Part of this drop is applied to grid 150 and tube 141 is rendered non-conducting again. This circuit now remain at rest until another negative pulse is applied to lead 136. It is noted that the time during which the tube 138 remains non-conducting is dependent on the time that condenser 139 takes to fully acquire its charge and stop current from flowing through resistor 133. Thus, the length of the output pulse which apepars on lead 153 may be adjusted by means of the time constant of resistor 133 and condenser 139. A timed negative pulse is thus produced in the output lead 153 which is independent of the length of the input pulse or of the silent period which produced such pulse.

The lead 153 is connected through a condenser 160 to a grounded resistor 161 and thence to inhibiting leads 162. The leads 162 are connected to the amplifier tube grids of the other monitors corresponding to the second control grid 110 of tube 93 and grid 256 of tube 257 as later discussed. Likewise the lead 111 supplying the second control grid 110 of the tube 93 is connected to receive the inhibiting potential from the various monitors tuned to other radio programs.

Hence when a silence occurs on any of the radio programs to which the other monitors are tuned, an inhibiting signal is supplied to the lead 111 which prevents the tube 93 from functioning and the lead 115 connected to the anode 114 of the tube 93 carries a sinusoidal current only during periods of silence on the program to which the receiver 75 is tuned and provided no silence occurs in the programs to which the other monitors are tuned so as to introduce a simultaneous signal on lead 111.

The lead 115 is connected through a condenser 170 to a rectifier tube 171 which is grounded at 172 and across which a resistor 173 and by-pass condenser 174 are connected to ground. The rectifier tube 171 is connected to rectify the output of the tube 93 and to cause a direct current negative pulse to be produced across the resistor 173. This voltage is smoothed out by the condenser 174 so that a negative signal appears during the periods of audio silence on the radio. The resistor 173 and rectifier 171 are connected through a condenser 180 and lead 183 to a rectifier tube 181, by-passed by a grounded resistor 182, which constitute a differentiator network adapted to convert the sharp voltage rise across the resistor 173 into a relatively large negative pulse. The diode 181 short circuits any positive pulses which may appear in the lead 183 so as to prevent such positive pulses from affecting the subsequent circuits. The lead 183 accordingly carries negative pulses corresponding to the periods of audio frequency silence in the receiver 75.

The lead 183 is connected to the control grid 184 (Fig. 4) of a tube 185 and through a condenser 186 to the anode 187 of a tube 188. The anodes 189 and 187 are connected through resistors 190 and 191 respectively to a source of positive plate potential. The tubes 185 and 188 are provided with cathodes 193 and 194 respectively which are grounded at 198 and are connected through a biasing battery 199, lead 200 and resistor 201 to the control grid 202 of tube 188. Grid 202 is also connected through a resistor 203 to a lead 204 and to the anode 189.

The tubes 185 and 188 are connected to operate as a gate circuit similar to the tubes 138 and 141, and are adapted to produce an output pulse in the lead 204, the duration of which is independent of the duration of the input pulse on the lead 183. The tube 185 is normally conducting and the tube 188 is normally non-conducting. Upon the application of a negative pulse to the grid 184 the tube 185 becomes non-conducting and the tube 188 becomes conducting. When the tube 185 becomes non-conducting the potential of the anode 189 rises due to the removal of the voltage drop through the resistor 190. Hence a positive pulse is applied to lead 204. When the tube 188 becomes conducting the bias voltages of the tubes are affected so as to cause the tube 185 to again become conducting and the tube 188 to become non-conducting. The period required for this cycle depends upon the values of the condenser 186 and of the resistor 182 and is independent of the duration of the negative signal supplied by the input lead 183. Hence a timed positive DC pulse is produced in the output lead 204.

The positive pulse on the lead 204 is connected through a condenser 210 and lead 211 to the control grid 212 of an amplifier tube 213 having a cathode 214 which is connected to ground through a biasing battery 215. The tube 213 has an anode 216 connected by a lead 217 to a brake coil 220 and thence to a source of positive plate potential. A resistor 221 is connected from the lead 211 to ground.

The brake coil 220 is connected to energize a magnet 225 which applied a magnetic drag to a disc 226 connected to a shaft 227 of a standard var meter 228 which is adapted to position the shaft 227 in accordance with the reactive volt amperes of the power line 67. The tube 213 is normally biased to cut-off, but is caused to become conducting due to the positive pulse on the lead 211 and, while conducting, actuates the brake circuit of the var meter 228. Hence during such periods a drag is applied to the var meter 228 which prevents the same from responding to any change in inductive load of the power line 67 during such periods.

A second var meter 230 is connected to the power line 67 and is provided with a shaft 231 which is positioned in accordance with the inductive load on the line 67. The shafts 227 and 231 are connected respectively to rotate a pair of coils 232 and 233 which are so positioned that when the var meters 228 and 230 are indicating the same reactive load the axes of the coils 232 and 233 are displaced by 90 degrees so that there is no magnetic coupling between such coils. When the relative positions of the axes vary from 90 degrees, however, a magnetic coupling is produced which is dependent upon the relative angles.

One of the coils, shown as the coil 233, is connected to a source of alternating current 234, for example a 1000 cycle oscillator. The other coil 232 is connected by a lead 235 to a variable tap 236 on a resistor 237 which is connected in series with a condenser 238 between the lead 204 and ground. The other end of the coil 232 is connected by a lead 240 to a control grid 241 of a tube 242 having a cathode 243 which is connected through a resistor 244, by-passed by condenser 245, and through a biasing battery 246 to ground. The tube 242 is provided with an anode 247 which is connected by a lead 248 and a resistor 249 to a source of plate potential.

For small angles not exceeding 15 to 20 degrees the voltage generated in the coil 232 as a result of the magnetic coupling with coil 233 will be proportional to the angle between the shafts 227 and 231. Hence the voltage in the lead 240 consists of a portion of the D. C. voltage drop across the resistor 237 and an alternating voltage derived from the coil 233 whose magnitude is proportional to the angle between the axes of the coils 232 and 233.

The tube 242 is normally biased to cut-off by means of battery 246, but is made conducting due to the positive pulse supplied from the resistor 237. Hence for the duration of the timed positive pulse in the lead 204 the tube 242 operates as an amplifier to amplify the A. C. voltage received from the coil 232. Inasmuch as the var meter 228 has been rendered sluggish due to the magnetic brake during the period of the positive pulse on the line 204, the var meter 228 is prevented from registering the increment in reactive-volt-amperes in the power line during the measurement period, whereas the var meter 230 responds to such increment. The angular difference between the shafts accordingly constitutes a measure of the increment of reactive-volt-amperes in the power line 67 during the measurement period.

The output lead 248 of the tube 242 is connected through a condenser 255 to the control grid 256 of an amplifier tube 257 and to a resistor 264. Resistor 264 is connected to lead 265 which is connected to input lines 111 to receive the inhibitor signals from the other monitors. Should a silence occur on any of the other monitors, tube 257 will be rendered non-conducting and its output will be zero. Consequently, the recorder will cease to record.

Tube 257 has a cathode 258 which is connected to ground through a resistor 259 and a by-pass condenser 260, and has an anode 261 which is connected by an output lead 262 and a resistor 263 to a source of positive plate potential. The lead 262 is connected through a condenser 270 to a rectifier tube 271 across the output of which a resistor 272 is connected. The operation is such that a direct current is passed through the resistor 272 proportional to the alternating voltage supplied by the lead 240 to the amplifier tube 242. Hence the voltage drop produced across such resistor is proportional to the increment in reactive-volt-amperes being measured.

The voltage drop across the resistor 272 is supplied by a lead 273 to a suitable recording device 274 which may constitute a voltmeter or a continuous recorder. A recorder is preferably used in order to obtain a continuous and permanent record.

To summarize the operation of the monitor system of Figs. 3 and 4, the receiver 75 is tuned to the program which is to be monitored and is adapted to produce the usual audio frequency output signal. This output signal is applied through the transformer 79 and secondaries 80 and 81 to the two control signal circuits A and B. The control circuit B produces a negative inhibiting pulse during periods of audio silence and the control circuit A produces a positive control pulse during such silent periods. The positive control pulse from the circuit A is supplied to the control grid of the amplifier tube 93 which is normally so biased that this positive control signal renders the tube conductive. At the same time the negative inhibiting signal from the circuit B is supplied by the lead 162 to the amplifier tubes of the other monitors corresponding to tubes 93 and 257 and prevents them from operating. Hence the monitors are prevented from producing a control signal or from recording even though their gate circuits may have started to function.

An alternating voltage is supplied by the oscillator 95 to the tube 93 and is amplified by that tube when the tube becomes unblocked by the positive control signal from the circuit A. The alternating current output of the tube 93 is supplied by the lead 115 to the rectifier 171 which is connected to produce a negative D. C. pulse across the resistor 173 during periods when the tube 93 is conducting. This pulse passes through the filter circuit comprising the condensers 174 and 180 and resistor 182 and any positive pulse is short circuited by the rectifier tube 181. Hence a negative pulse appears on the lead 183 whenever the tube 93 is made conductive by a positive pulse from the control circuit A.

The negative pulse on the lead 183 is applied to the grid 184 of the gate circuit tube 185 which is normally conducting. This negative pulse causes the tube 185 to become non-conducting and the gate circuit, including the tubes 185 and 188, is so adjusted that the tube 185 remains non-conducting for a predetermined period of time, regardless of the duration of the negative pulse which initiated the action. This results in a timed positive pulse in the output lead 204 which is applied to the control grid 212 of the tube 213. The tube 213 is thus made conducting for the predetermined period of time and energizes the brake coil 220 to apply a drag to the var meter 228. During this same period of time the tube 242 is made conductive through the positive bias supplied from the resistor 237 and transmits an alternating voltage which is dependent upon the relative angular positions of the coils 232 and 233. This voltage, after amplification in the tubes 242 and 257 and rectification in the tube 271, produces a unidirectional voltage across the resistor 272, the value of which is recorded on the recorder 274.

The adjustments of these circuits are preferably so made that the recordings take place a fraction of a second after the reactors 64 have been connected to the line 67, so as to eliminate the effect of any pulses which might take place at the instant of connection.

It will be evident that the recorded signal is independent of the total reactive-volt-amperes in the power line 67 and is responsive only to the increment in reactive-volt-amperes after the brake coil 220 has been energized.

It is to be understood that in practice, if for example four major network stations are to be monitored, a separate monitor will be provided for each of these stations and other monitors would be tuned to the stations not affiliated with the networks. The other monitors would be connected to produce the inhibiting signal and would inhibit all the network recorders whenever one of these non-network stations had a period of silence. The actual recording may take place in only a fraction of a second so that the influence of other reactive loads on the power line would have a minimum of opportunity of affecting the record. The recorder 274 may of course be graduated to read directly in number of sets. As each set introduces a unit reactance onto the line, the total number of units connected at any one time may be readily determined.

Assuming, for example, that a hundred different home units are in the group to be sampled and that each one of these home units is provided with the circuit shown at the left of Fig. 1, including a reactance 19, which has a value of one unit. Then, if ten of these receivers are tuned to program A, for example, the ten reactors 19 will be thrown on and off of the line simultaneously when there is a silence in the received program. This will result in increasing the total reactance on the line 12 by ten units. It should be noted that these reactance pulses may be of short duration, such as a fraction of a second and may occur several times a second, as between the syllables of a spoken word. Hence they will occur at irregular intervals and in a timed sequence corresponding to the instantaneous changes in a signal level of the program.

Referring now to Fig. 4 and assuming that only these ten home receivers are in operation, the var meters 228 and 230 will both register 0 before the reactances 19 are thrown on the line. During the instant when the ten reactances 19 are thrown on the line, however, the var meter 228 will continue to register 0 due to the drag exerted by the disc 226. The var meter 230, however, will register ten units of inductance. This ten unit differential in the readings of the two var meters is registered on the recorder 274 as above described and indicates that ten receivers are tuned to Station A.

Now assuming that twenty other receivers are tuned to a station, such as station B, the inductances 19 associated with these other receivers will be thrown on and off the line in a timed sequence, depending upon the program being broadcast by Station B. Except in rare instances, however, the inductances 19 of the receivers tuned to Station B would not be thrown on the line at the same instant as the ten inductances of the receivers which have been assumed to be tuned to the Station A.

Assuming now that a silent period on Station B occurs slightly before a silence period occurs on Station A, then the twenty inductors of the twenty receivers tuned to Station B would be thrown on the line and would produce an inductance of twenty units on the line, which would be registered by var meters 228 and 230. If now the silence period on Station A should occur while these other inductances are still on the line, the ten additional inductances 19 would be thrown on the line raising the total inductance on the line to thirty units which would be registered by the var meter 230. However, the var meter 228 would remain at twenty units due to the drag of the disc 226 and the difference in reading of ten units would represent the number of stations tuned to Station A. Hence the indication on the recorder 274 which is made at the time of the silences on Station A will give an accurate measurement of the number of home units tuned to that station regardless of whether other units are tuned at the same time to different stations and regardless of whether other inductors may be connected to the line during the time when the inductors of the receivers tuned to Station A are inserted.

It will be noted that the above described system does not require the cooperation of the broadcasting station, but only requires that the main power line be available for effecting the measurement. The system is practically instantaneous in operation and produces a continuous record of the listener reaction.

The monitor system of Figs. 3 and 4 has been described as responsive to silence periods. It may, however, be varied as described above to respond to other program characteristics as in the case of the home unit of Fig. 2, and in any event would respond to the same characteristic as the home receivers.

Although a specific circuit for accomplishing this result has been set forth for purposes of illustration, it is to be understood that changes and modifications may be made therein as will be apparent to a person skilled in the art. Only so much of the circuit has been shown as is necessary to an understanding of the invention. The circuit will, of course, include various controls, sources of potential, etc. which are well known in the art. Also the individual elements of the circuit may be varied. The invention is only to be restricted in accordance with the scope of the following claims.

What is claimed is:

1. The method of determining whether a remote radio receiver which is tunable to any one of a plurality of different radio broadcast programs is tuned to a selected one of said programs, which comprises deriving from the remote receiver a time sequence based on the recurrence of selected normally irregularly recurring changes in instantaneous signal intensity of the signals of the program being received thereby, monitoring said selected program by a monitor receiver independently of said remote receiver, simultaneously deriving a time sequence based on the recurrences of the same selected normally irregularly recurring changes in instantaneous signal intensity of the signals being received by said monitor receiver, and comparing the time sequences of said selected changes which are derived at the same instants from said remote received and from said monitor receiver to determine their coincidence or lack of coincidence.

2. A radio listener survey system comprising a plurality of radio broadcast receivers tunable to a plurality of broadcast transmitters, a known electrical load at each receiver, means at each receiver responsive to the acoustic level of the received program and adapted to produce a control signal when the acoustic level reaches a predetermined value, an electrical conducting line at each receiver connected to a central point, a timed relay to connect said load to said line, and means responsive to said control signal to actuate said relay, a monitoring receiver tuned to a selected broadcast transmitter and having means producing a control signal in response to said predetermined acoustic level, means measuring the increment in load on said line, and means responsive to the control signal of said monitoring receiver to actuate said measuring device.

3. A radio listener survey system comprising a plurality of monitoring receivers tuned to different selected broadcast transmitters and having audio frequency output circuits carrying audio signals, a control circuit connected to each output circuit and responsive only to a predetermined characteristic of said signal, said control circuits each having means producing a control signal and an inhibiting signal, an electrical conducting line, a device for measuring the load on said line, a circuit responsive to said control signal of each monitor to render said measuring device operative, and a circuit responsive to the inhibiting signal of each monitor to prevent operation of the measuring devices of all other monitors.

4. A radio listener survey system comprising a monitoring receiver tuned to a selected broadcast transmitter and having an output circuit carrying a received signal, a control circuit connected to said output circuit and responsive only to a predetermined normal characteristic of said signal, said control circuit comprising a rectifier and a resistor connected to develop a unidirectional voltage across said resistor which is a function of the received signal, a circuit connected to respond to said unidirectional voltage and to produce a timed voltage pulse of a given duration regardless of the duration of said unidirectional voltage, a load carrying line, a measuring device to measure the increment in load on said line, and means responsive to said timed pulse to actuate said measuring device.

5. A radio listener survey system comprising a monitoring receiver tuned to a selected broadcast transmitter and having an output circuit carrying a received signal, a control circuit connected to said output circuit and responsive only to a predetermined characteristic of said signal, said control circuit comprising a rectifier and a resistor connected to develop a unidirectional voltage across said resistor which is a function of said received signal, a source of alternating voltage, an amplifier connected to amplify said alternating voltage, connections supplying the potential drop across said resistor as a control bias for said amplifier tube and arranged to render said amplifier tube conductive only during periods when said received signal has a predetermined value, means rectifying the alternating potential output of said amplifier tube to produce a negative pulse corresponding in duration to the periods of operation of said amplifier tube, a timed gate circuit including a pair of tubes connected to respond to said negative pulse and to produce a positive pulse of a given duration regardless of the duration of said negative pulse, a load carrying line, a pair of measuring devices connected to measure the load on said line and having shafts carrying coils normally positioned in non-inductive relationship when said measuring devices have the same reading and shiftable by said shafts to inductive relationship in response to a difference in readings of said measuring devices, a magnetic brake associated with one of said measuring devices, means including an amplifier tube actuated by said timed positive pulse to render said brake effective during the period of said pulse to prevent change in reading of said braked device whereby the difference in readings of said device represents the increment in load during said period, an alternating voltage source connected to excite one of said coils, an amplifier tube connected to respond to the voltage induced in the other of said coils, means responsive to said timed positive pulse to render said last amplifier tube operative during the period of said timed pulse, and a responsive device connected to the output circuit of said last amplifier tube.

6. A radio listener survey system comprising a plurality of monitoring receivers tuned to selected broadcast transmitters and having output circuits carrying received signals, a pair of control circuits connected to said output circuit of each monitoring receiver and responsive only to a predetermined characteristic of said signal, said control circuits each comprising a rectifier and a resistor connected to develop a unidirectional voltage across said resistor which is a function of said signal, a source of alternating voltage, an amplifier connected to amplify said alternating voltage, connections supplying the potential drop across said resistor of one of said control circuits as a control bias for said amplifier tube and arranged to render said amplifier tube conductive only during periods when said signal has a predetermined value, connections supplying the potential drop across said resistor of the other control circuit as a control bias for the corresponding amplifier tubes of the other monitoring receivers to block said other amplifier tubes during said period, means rectifying the alternating potential output of said amplifier tube to produce a negative pulse corresponding in duration to the periods of operation of said amplifier tube, a timed gate circuit including a pair of tubes connected to respond to said negative pulse and to produce a timed positive pulse of a given duration regardless of the duration of said negative pulse, a load carrying line, a pair of measuring devices connected to measure the load on said line and having shafts carrying coils normally positioned in noninductive relationship when said measuring devices have the same reading and shiftable by said shafts to inductive relationship in response to a difference in readings of said devices, a magnetic brake associated with one of said devices, means including an amplifier tube actuated by said timed positive pulse to render said brake effective during the period of said pulse to prevent change in reading of said braked device whereby the difference in readings represents the increment in load during said period, an alternating voltage source connected to excite one of said coils, an amplifier tube connected to respond to the voltage induced in the other of said coils, means responsive to said timed positive pulse to render said last amplifier tube operative during the periods of said timed pulse, and a responsive device connected to the output circuit of said last amplifier tube.

7. A radio listener survey system comprising a plurality of radio broadcast receivers tunable to a plurality of broadcast transmitters, a known electrical load at each receiver, a control circuit connected to each receiver and having means responsive to a given normal, recurring characteristic of the received program, an electrical conducting line at each receiver connected to a central point, a relay circuit actuated by said control circuit to connect said electrical load across said line, a monitoring receiver tuned to a selected broadcast transmitter and having a control circuit having means responsive to the given program characteristic, a measuring device connected to measure the total electrical load on said line, and means actuated by said last control circuit to actuate said measuring device.

8. A radio listener survey system comprising a plurality of radio broadcast receivers tunable to a plurality of broadcast transmitters, a known electrical load at each receiver, a control circuit connected to the output of each receiver and having means responsive to a given acoustic level of the received program, an electrical conducting line at each receiver connected to a central point, a relay circuit actuated by said control circuit to connect said electrical load across said line, a monitoring receiver tuned to a selected broadcast transmitter and having a control circuit having means responsive to the given acoustic level, a measuring device connected to measure the total electrical load on said line, and means actuated by said last control circuit to actuate said measuring device.

9. A radio listener survey system comprising a plurality of radio broadcast receivers tunable to a plurality of broadcast transmitters, a known electrical load at each receiver, a control circuit connected to the output of each receiver and having means responsive to periods of audio silence of the received program, an electrical conducting line at each receiver connected to a central point, a relay circuit actuated by said control circuit to connect said electrical load across said line, a monitoring receiver tuned to a selected broadcast transmitter and having a control circuit having means responsive to said periods of audio silence, a measuring device to measure the total electrical load on said line, and means actuated by said last control circuit to actuate said measuring device.

10. A radio listener survey system comprising a plurality of radio broadcast receivers and tunable to a plurality of broadcast transmitters, a known reactive load at each receiver, a control circuit connected to the output of each receiver and having means responsive to periods of audio silence of the received program to produce a control impulse, an electrical conducting line at each receiver connected to a central point, a relay circuit actuated by said control impulse to connect said reactive load across said line, a monitoring receiver tuned to a selected broadcast transmitter and having a control circuit responsive to the program received from said selected transmitter and having means responsive to periods of audio silence to produce a control impulse, a measuring device to measure the total reactive load on said line, and means actuated by said last control impulse to actuate said measuring device.

11. A radio listener survey system comprising a plurality of radio broadcast receivers tunable to a plurality of broadcast transmitters, a known electrical load at each receiver, a control circuit connected to the output of each receiver and having means responsive to a normal, recurring program characteristic of the received program to produce a control impulse, an electrical conducting line at each receiver connected to a central point, a timed relay circuit actuated by said control impulse to connect said load across said line for a predetermined period of time regardless of the duration of the control impulse, a monitoring receiver tuned to the selected broadcast transmitter and having a control circuit having means responsive to said normal, recurring program characteristic to produce a control impulse, a measuring device to measure the total load on said line, and means actuated by said last control impulse to actuate said measuring device during the period of connection of said electrical loads at said receivers.

12. A radio listener survey system comprising a plurality of radio broadcast receivers tunable to a plurality of broadcast transmitters, a known electrical load at each receiver, a control circuit connected to the output of each receiver and having means responsive to a normal, recurring program characteristic of the received program to produce a control impulse, an electrical conducting line at each receiver connected to a central point, a relay circuit actuated by said control impulse to connect said electrical load across said line, a plurality of monitoring receivers tuned to selected broadcast transmitters, each monitor having a control circuit having means responsive to said normal, recurring program characteristic to produce a control signal and an inhibiting signal, each monitor having a measuring device to measure the total load on said line, means actuated by the control signal of each monitor to actuate its measuring device, and means actuated by the inhibiting signal of each monitor to prevent actuation of the measuring devices of all other monitors.

WILLIAM D. HORN.
JOHN R. RAGAZZINI.

REFERENCES CITED

The following references are of record in the file of this patent:

UNITED STATES PATENTS

| Number | Name | Date |
|---|---|---|
| 2,096,109 | Hopkins | Oct. 19, 1937 |
| 2,188,165 | Thomas | Jan. 23, 1940 |
| 2,249,324 | Potter | July 15, 1941 |
| 2,393,060 | Reagan | Jan. 15, 1946 |
| 2,397,475 | Dinga | Apr. 2, 1946 |